UNITED STATES PATENT OFFICE.

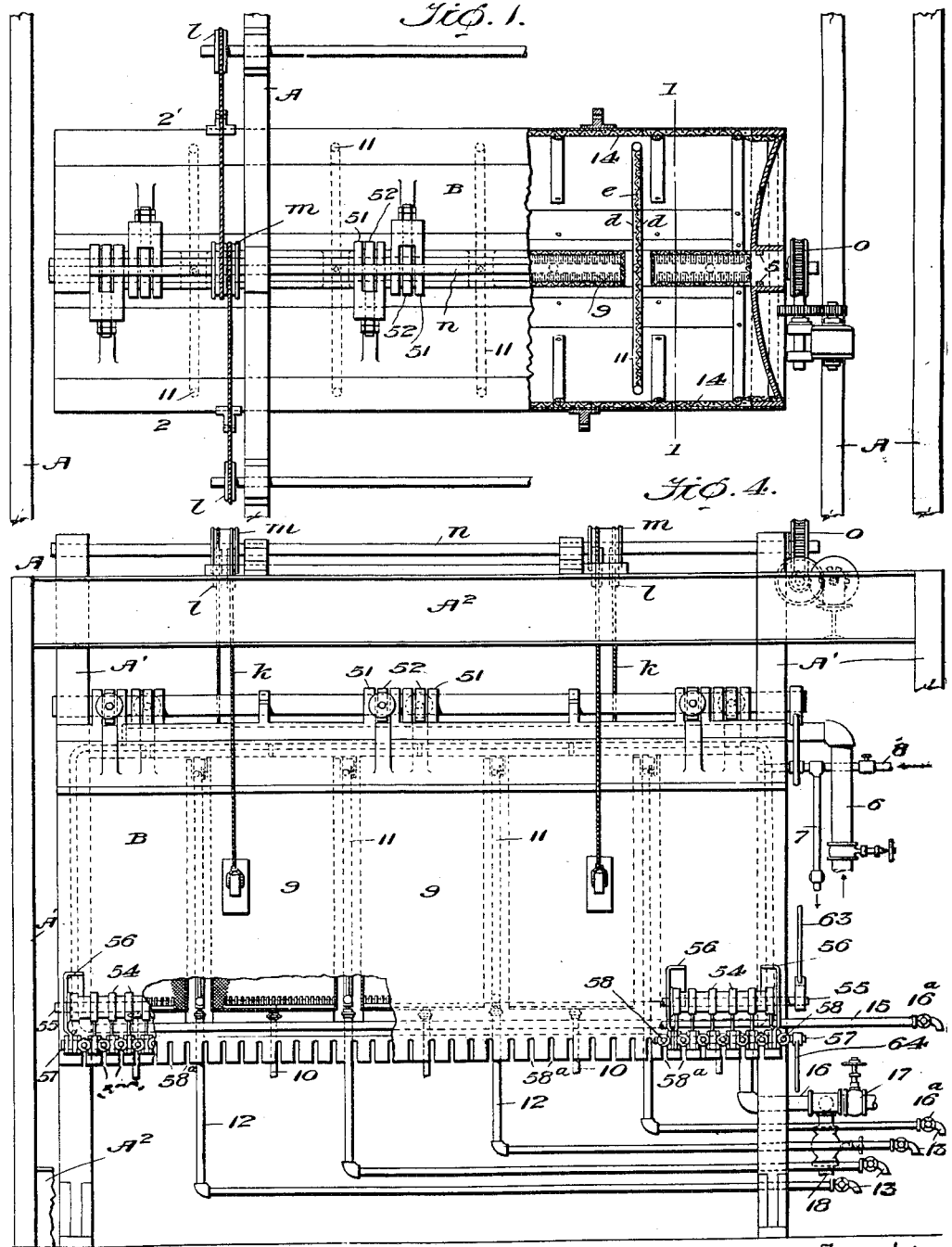

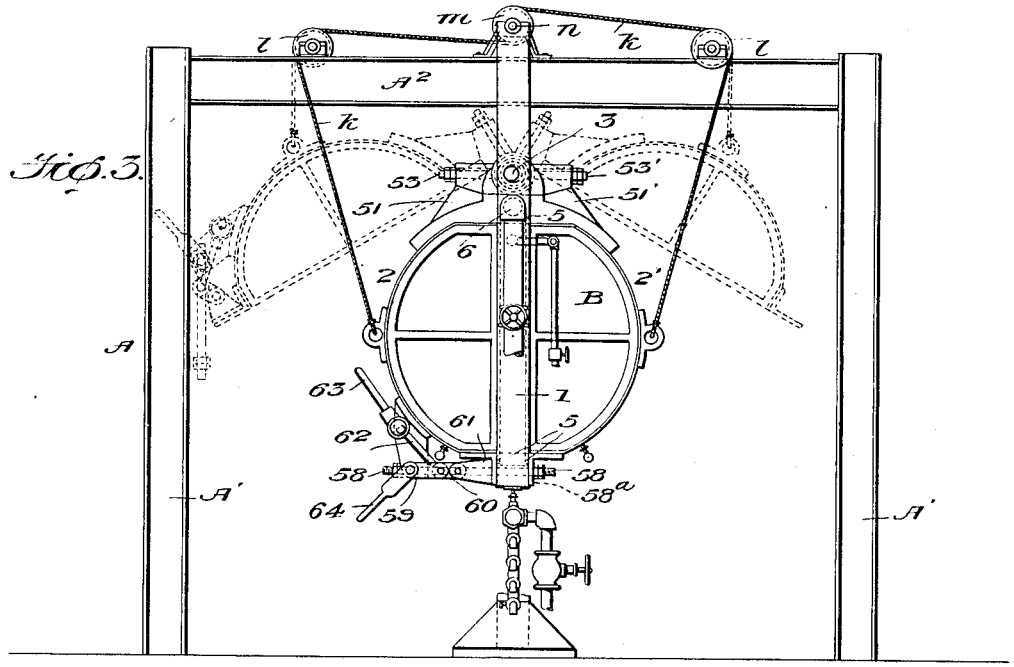
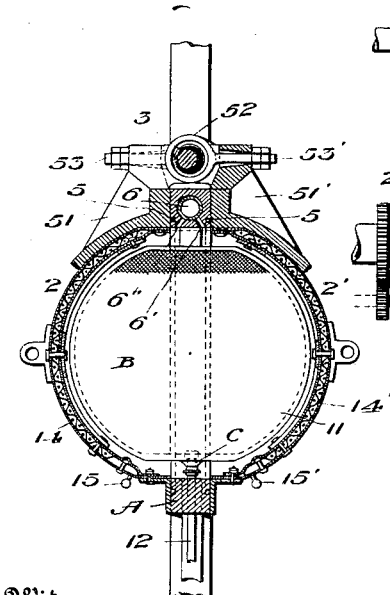
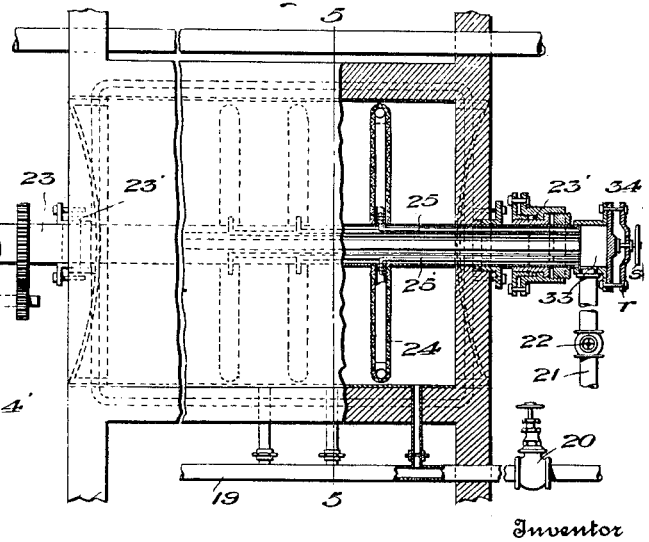

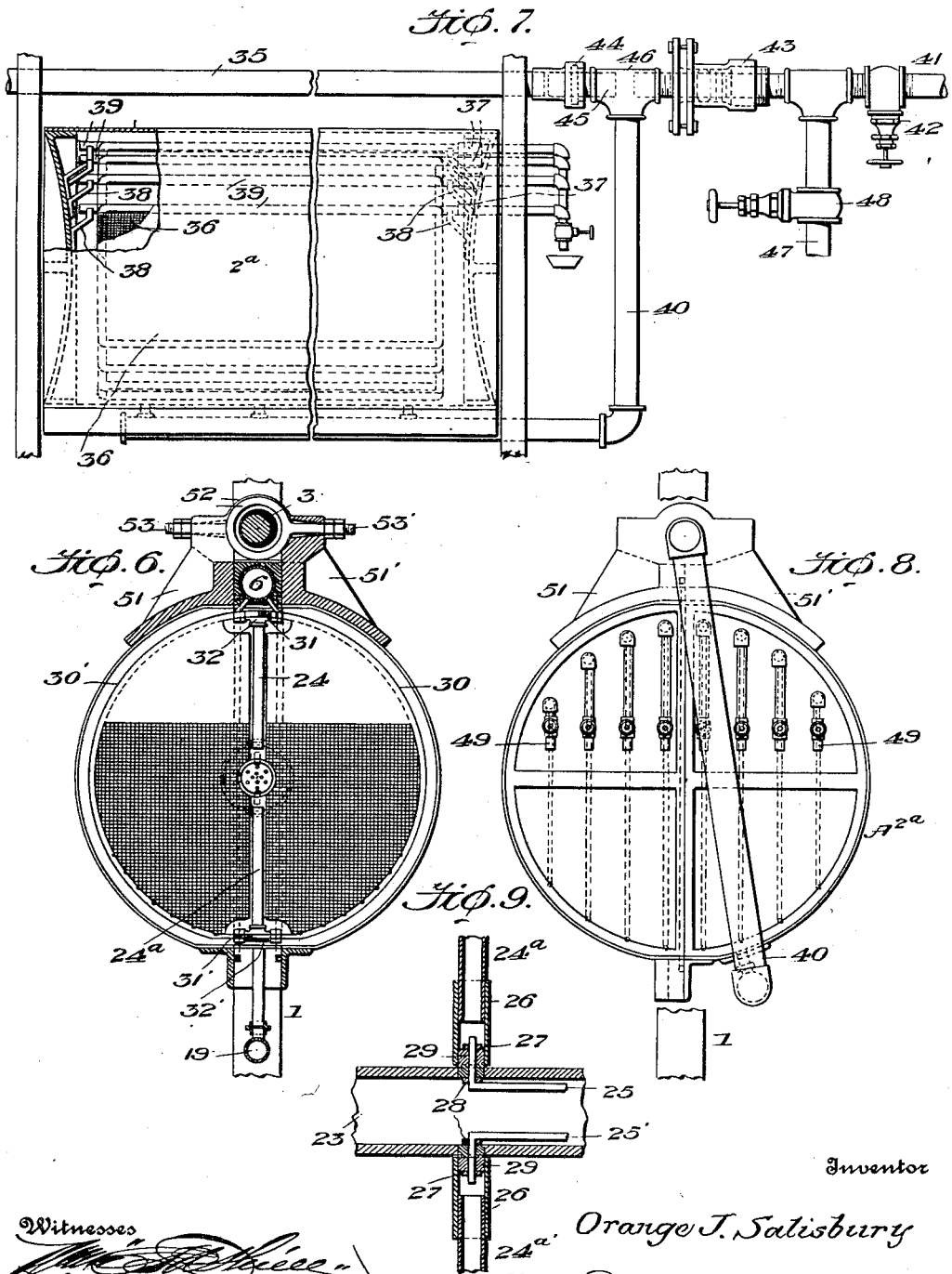

ORANGE JAMES SALISBURY, OF SALT LAKE CITY, UTAH.

FILTER-PRESS.

1,120,628.  Specification of Letters Patent.  Patented Dec. 8, 1914.

Application filed September 30, 1914. Serial No. 864,307.

*To all whom it may concern:*

Be it known, that I, ORANGE J. SALISBURY, a citizen of the United States, residing at Salt Lake City, in the county of Salt Lake and State of Utah, have invented certain new and useful Improvements in Filter-Presses, of which the following is a specification.

My invention relates to an apparatus designed primarily to separate slimes from which precious metals have been dissolved and the liquid which holds the precious metals in solution. In the cyanid process, for example, when gold or silver bearing slimes are mixed or brought into contact with the cyanid solution, the precious metals are dissolved and carried in the liquid in a state of solution.

To effect a separation of the metal-bearing solution from the solid matter or slimes-tailings by means of an improved filtering apparatus is the essential object of the present invention.

While my invention has been found particularly useful for metallurgical work, it is not, however, limited to this use, since it may be successfully employed in other fields, and substantially wherever the separation of solids from liquid matter is desired. It will be understood, therefore, that the filtering apparatus which I am about to describe is capable of almost universal use and hence I may employ it in the filtration of mineral-bearing slimes and also in filtering saccharine solutions, chemicals, or wherever it is purposed to separate a liquid from a solid matter and to discharge the solid matter which has accumulated upon the outside of the filtering medium during the filtering process.

With the above and other objects in view my invention consists of the parts and the constructions, arrangements and combinations of parts substantially as I will hereinafter describe and claim.

In the accompanying drawings forming a part of this specification and in which similar reference characters indicate like parts in the several views:—Figure 1 is a plan view, partially in section, of a filer-press embodying the salient features of my invention. Fig. 2 is a vertical cross-sectional view of the same on the line 1—1 of Fig. 1. Fig. 3 is an end elevation, showing in dotted lines, the separation of the sections of the press shell or casing. Fig. 4 is a side elevation, partially broken away. Fig. 5 is a side elevation, partially in section, of a filter press of modified form. Fig. 6 is a cross-sectional view of the same on the line 5—5 of Fig. 5. Fig. 7 is a side elevation, showing another form of filter press. Fig. 8 is an end view of Fig. 7. Fig. 9 is an enlarged sectional detail, showing one manner of mounting rotatable filter-leaves.

Referring to the construction of filter-press shown in Figs. 1 to 4 inclusive, A represents a supporting framework of suitable form and construction and herein shown as comprising vertical uprights, A', and connecting cross-bars, $A^2$, and which frame-work supports the filter-press shell or casing and its associated parts, as I will presently describe.

The filter-press proper comprises a shell or casing B, formed, preferably, of two similar parts or sections, 2—2', hingedly secured at their upper portions so that they may be opened by separating the sections in lateral planes to cause them to assume the discharging position shown in dotted lines in Fig. 3, said sections being provided with suitable mechanism at their lower or free portions, whereby the sections may be secured and locked together to provide against leakage and internal pressures, during the filtering operation.

In the drawings I have shown several methods of arranging the filter leaves or elements on the interior of the shell or casing and hence the particular disposition of these filtering leaves or elements may be of any desired character and may be varied at pleasure without departing from the spirit of my invention.

In Figs. 1 and 2 it is designed that the filtering leaves or elements, 11, shall be secured to the central or other part of the stationary frame, A, by suitable nipples or connections, c, as shown particularly in Fig. 2, said filtering leaves or elements, in this case, being of substantially circular form to conform to the curvature of the inner wall of the shell or casing, B, and said filtering elements, or leaves being of the construction usually employed in filter presses; that is, each filter leaf may have filtering sides, d, of suitable fabric or fibrous material, and an internal foraminous plate, e, which forms a backing and spacing member for the sides and an internal chamber which connects with a suitable conduit or outlet at the periphery or edge of the medium through which the liquid filtrate may be discharged. In Fig. 2, it will be seen that the discharge of the liquid or filtrate is through the bottom of the filtering leaf or medium and to this end I employ a pipe, 12, which is supported in the main frame and through which pipe the interior space or chamber of the filter medium may be drained by gravity.

The filter leaves may be arranged in any suitable manner. They may extend longitudinally of the shell or casing and which shell preferably has greater length than diameter, or the leaves may be arranged crosswise. In Fig. 1, I show certain of the filtering leaves, 9, as extending longitudinally of the shell or casing and other leaves, 11, as extending crosswise of the casing, the arrangement being such that the crosswise extending leaves alternate with the longitudinally extending leaves, but this arrangement may be modified in any desired manner. Also, if desired, a filtering medium, 14, may be arranged concentric with and supported slightly from the curved inner walls of the sides, 2, 2', constituting the shell or casing, which arrangement may at times, be desirable, as I will hereinafter explain, said filtering medium, 14, in this latter instance, being appropriately secured by bolts or otherwise, to the hinged sections of the filter shell or casing in such manner that they are carried by said sides and opened and closed therewith.

For a very free filtering material, I sometimes dispense with the internal filters except those which are last referred to, namely, those (14) which conform to and are secured along the inner sides of the sectional shell or casing; but if more filtering surface is required, I may use either the longitudinal filtering elements, 9, running lengthwise of the shell or casing or I may use crosswise filter leaves or elements, which are semi-circular in form and which are suitably attached directly to each half of the shell or casing. (Not shown).

From the foregoing description it will be apparent that in my invention I divide or split the shell or casing of the press longitudinally along one side and that I provide hinge-means along the upper longitudinal edges of the divided sections, thus formed, whereby the sections may be opened laterally to cause them to assume the dumping dotted positions of Fig. 3, and that means are employed for appropriately securing the sections in liquid-tight condition, while the press is in operation. The specific means for hinging the sections of the shell or casing so that they may operate as described, and the specific means for locking the sections in operative position are intended to represent any equivalent construction by which the several operations about to be described may be effected. According to the arrangement shown in Figs. 1 to 4 inclusive, the upper portions of the sections, 2, 2', are hingedly secured. This upper locking mechanism comprises hinged members, 51, 51', through which pass transversely suitable bolts, 53, 53', said members 51, 51', being mounted on a supporting shaft, 3. The hinge members 51, 51', are slotted to admit of a slight horizontal movement which is imparted to them by suitable eccentrics and eccentric straps, 52 through the bolts, 53, 53', before mentioned. This mechanism is operated by partially revolving the supporting shaft, 3, by a handle or other means, to which the eccentrics are connected, or otherwise fixedly secured with the result that when the handle is operated, the hinge-members, 51, 51', are moved horizontally for a slight distance and brought into engagement with the corresponding faces of the stationary frame or support, A, and which latter is provided with gaskets or other packing, 5, which co-acts with the faces of the hinged sections to form a liquid-proof joint therebetween.

As one means for locking the sections together in operative position, I have shown in Figs. 3 and 4, an eccentric and toggle mechanism operatively connected to the free longitudinal edges of the swinging sections of the casing and which mechanism comprises suitable eccentrics and straps 54, mounted on a shaft, 55, which is supported by bearings, 56, secured at intervals on the outer lower sides of one of the sections, 2, of the shell or casing, said bearings, 56, being slotted to receive a shaft, 57, to which are attached the locking bolts, 58, which may be adjusted by means of appropriate nuts, said bolts engageable in slots 58ª formed in the projecting lower portions of the casing sections, 2, 2', Fig. 4.

Suitable toggles, 59 and 60, are attached to brackets, 61, and shaft, 57, and an eccentric rod, 62, connects the eccentric straps to the toggles, 59 and 60. A handle, 63, is attached to the shaft, 55, by which this shaft is rotated in its bearings, and a handle, 64, is attached to the shaft, 57, for a similar purpose.

The mechanism in Fig. 3 is shown in a locked position. To unlock the same, the handle, 63, is rotated through an arc of 180 degrees, thus causing the eccentrics with their attachments to break the toggles 59 and 60, which will give to them a position similar to that shown in the dotted lines. When the toggle links, 59 and 60, are thrown out of a straight line, this causes the shaft, 57, with its attached bolts, 58, to move toward the frame, A. The slots in the bearings 56 permit this movement of the shaft with its attached bolts. When the tension of the bolts 58 is relaxed, and the bolts are moved, as described, they are then free to swing downwardly out of the slots, 58ª contained in the projecting ends of the casing, 2 and 2', which, it is obvious, brings the eccentric and toggle mechanism to an unlocked position as shown by dotted lines. To return the bolts to a locked position again, it is quite obvious that a reversal of the unlocking operation is performed.

Various hoisting means may be adapted for opening the sections, 2, 2', of the filter shell or casing. The means herein shown comprises flexible connections, $k$, extending from the outer sides of said sections over suitable guide pulleys, $l$ to a winding drum, $m$, around which the connections are coiled in opposite directions, said drum being mounted on an appropriate shaft, $n$, to which rotation may be imparted through the means of any suitable driving mechanism represented generally at $o$. Through this mechanism the shaft is rotated and the flexible connections are caused to wind in opposite directions around the drum, thus moving the sections of the shell or casing outwardly and causing them to be lifted into the dotted position shown in Fig. 3, it being understood that before this operation can occur, the locking mechanism at the lower portion of the shell or casing has been operated to unlock said sections.

The material to be filtered may be delivered to the casing or shell through a suitable valve-controlling pipe, 6, and air displaced during this filling operation may escape from the tank through a valve-controlled pipe, 7, and air may be forced into the tank, when desired, through a suitable valve-controlled pipe, 8.

In order to make my invention better understood I will now describe one complete cycle of operation.

The sections, 2, 2', of the shell or casing are securely locked to the central portion of the stationary frame, A, by means of the eccentrics and eye-bolt mechanism at the top, and the eccentric and toggle-mechanism before described at the bottom. These mechanisms produce a strong locking effect and press the two halves of the shell against the gaskets, 5, which are shown as being located in grooves around the outer portion of the central stationary frame or support. When the sections of the shell are securely locked, the material to be filtered is forced into the shell under pressure through the pipe or conduit, 6, from which it enters the shell through the branches, 6', 6''. While I have shown a feed line at this portion of the apparatus, it is obvious that I may use the lower portion for the inlet if I find the same more desirable in actual conditions of use. As the shell is being filled by the slimes pulp or other material entering the press through the pipe or conduit, 6, the air displaced during this filling operation will escape through the valve-controlled pipe, 7. This outlet may or may not be used according to conditions, as I may sometimes permit the air to be forced out through the filter leaves or elements during the filling of the shell or casing. When the shell or casing is filled I close the valve in the air discharge pipe, 7, and when this is done, the hydraulic pressure begins to act and forces the liquid portion of the slimes pulp or other material being treated, through the filter leaves or elements to the inside thereof while the solid material is retained upon the outer surface of the filtering elements or leaves in cake-form. The liquid matter which has been forced from the filter leaves to the inside thereof will be delivered through the pipe connections shown to a point outside of the press.

With a free filtering material, and where it is required only to dewater the slimes pulp, when treating mineral-bearing slimes, I continue the filtration until the flow has practically stopped. In other words, I continue the filtering operation until the shell or casing of the press is substantially completely filled with solid material. After this is done, if it is desired to further reduce the moisture contained in the solids retained within the shell, I can introduce air or steam or other suitable gas to the interior of the shell or casing, and this causes a further drying of the so-called caked material. This air can be forced into the press either through the feed pipe, 6, or it can be forced through the aforesaid pipe, 8, and the supply of air or gas may be continued to any desired point.

During the filtering period, the filtrate is drawn off from the various filtering elements as follows: In the filters marked 9, the filtrate is withdrawn through the bottom and individual pipes, 10, and may be led to any desired point. The filters marked, 11, are provided with lower outlets to which are connected pipes, 12, which lead to a convenient point and are individually controlled by valves, 13. The filtrate from the curved side filters, 14, 14', may be drawn off through suitable pipes, 15, 15', controlled by valves, 16ª.

After the air-drying operation, the press may be opened to release the solid cake content. This is done by unlocking the eccentric mechanism at the top of the press and the eccentric and toggle-mechanisms at the bottom of the press, when the two halves of the shell may be swung outwardly in opposite directions about the shaft, 3, by the winding-drum mechanism before described, or by any suitable hoisting devices, which may be operated by any desired power.

In my description of the operation of this press, I have referred to the building of cakes to thickness which will substantially completely fill the shell or casing of the press, but it is obvious that I may also so operate the press as to build only a cake of nominal thickness on the outside of the filtering elements. In this latter case, I would withdraw the excess unfiltered material from the interior of the shell by means of a suitable draw-off pipe, 16, controlled by a valve, 17. During the withdrawal of this excess, I may introduce compressed air into the shell or casing through the pipe, 8, for the purpose of holding the cake in place on the filtering elements. When the shell is emptied of the excess material, I close the valve, 17, and subject the cakes to an air-drying operation, if this is required. Also, if it is necessary to displace the moisture contained values from the cakes before the drying operation, I can introduce a wash solution to the shell through a suitable valve-controlled pipe, 18, at the same time withdrawing the excess air through the pipe, 7, and closing the air pipe, 8. When the shell is filled with wash solution, the washing operation may be continued to any desired point, when the valve in the pipe, 18, is closed and the excess wash solution is withdrawn while under air pressure, through the valve, 17, and led back to its source. In other words, by the construction disclosed, I can operate the filter in any manner required by conditions maintaining at any given installation, since the apparatus can be arranged for building the shell full or building the cakes on the open filter leaves or surfaces, such cakes being in a condition for a washing operation or an air-blowing operation, or both.

In the construction of filter shown in Fig. 5, the filter leaves are of substantially semi-circular form and are attached to the right-angled ends of pipes, 25, extending through a hollow shaft, 23, which is supported by and rotated on a centrally fixed portion of the apparatus, suitable stuffing boxes, 23′, being used to prevent leakage around the outer ends of the shaft. This arrangement permits of a rotation of the filter leaves during the filtering operation to make homogeneous cakes or this rotation may be used to effect a cleansing of the outer sides of said leaves and which cleansing function may be performed while the sections of the shell or casing are in closed relation and the filters in contact with a cleansing solution. The filtrate cocks are usually closed during the cleansing operation to prevent any pressure on the outside of the filter elements; if a cake is formed upon the exterior surfaces of the semi-circular filtering leaves, this cake may be removed by revolving the central horizontal shaft, 23, with its attached filtering elements.

The cake may be discharged by centrifugal force resulting from rapid rotation of the filter elements or leaves, or other well known means may be employed to dislodge the cake during a slow rotation of the shaft and the filter leaves carried thereby. To remove the cakes in this manner the halves of the casing are first opened. In the aforesaid Fig. 5, I have shown means for feeding the material to the interior of the shell or casing, 2, 2′, and means for drawing the excess pulp from the casing, both of which operations can be performed by the pipe, 19, connecting by branches with the interior of the casing and controlled by a valve, 20. The filtrate is drawn off through a pipe, 21, controlled by a valve, 22, said pipe being fixedly secured and therefore stationary while the hollow shaft, 23, is revolving. By connecting the filter leaves, 24, of the rotary type shown in Fig. 5 to the individual pipes, 25, and extending these pipes axially through the central pipe, 23, I obtain individual outlets from the several semi-circular elements.

The hollow pipe, 23, is provided with branch pipes, 24$^a$, which are supplied with T-ends, 32, 32′, to which are connected pipes, 30, and 30′, which form part of the semi-circular filtering elements, said pipe, 30, discharging into a pipe-T, 32′, while the pipe, 30′, discharges into a T, 32, suitable plugs, 31, 31′, being employed to prevent any discharge from one of the two ends of the pipes, 30 and 30′. The filtrate from these semi-circular filters flows through pipes, 24$^a$, 24$^{a′}$, into pipes, 25, 25′, and thence into the T-coupling, 33. This permits the control of the individual outlets and affords clear vision of the filtrate by the removal of the cap, 34, with which the T-coupling, 33, is supplied, and which cap is held in place by a suitable locking mechanism which comprises a bar, $r$, and operating hand screw, $s$, as shown in Fig. 5. If it is necessary to shut off any one or more of the individual outlets at any time on account of leakage in the filter cloths, a plug or a pipe cap can be used to stop the flow.

I can also use a reverse current for distending the filter bags or for blowing through the filter medium from the interior of the filtering leaves or elements by forcing water or air, under pressure, through the pipe, 21, during the cake discharging operation, as will be readily understood by those skilled in this art.

As shown in Fig. 9, the hollow central pipe, 23, is tapped at various points and a plug or connection, 29, is employed to hold the right-angled end of each of the pipes, 25, 25′, in place and at the proper distance from the inner wall of the pipe, 23, by means of spacing washers, 28. A locking nut, 27, is used to hold the pipes to the plug or connection, 29, before mentioned. The connection, 29, may be in the form of a threaded plug to which is screwed the sleeve, 26, into which in turn is screwed a pipe, 24ª, 24ª′, which conducts the filtrate from a semi-circular filter to an individual outlet pipe, 25, 25′. I thus obtain individual outlets from semi-circular filtering leaves mounted on a hollow shaft and I overcome the objectionable point of making a hollow shaft a common header for the discharge from all of the filtering elements. In other words, each semi-circular filtering element has its own outlet and this may be shut off if desired. The reason for making the filtering element semi-circular, as in Fig. 5 and attaching them as shown, is for the purpose of removing them with facility to repair or replace the filtering cloth or sides.

In Fig. 5 I have shown a cross-section of one of the filtering leaves or elements; the thickness of the body of this element is such that there are no bulges or parts standing out beyond the filtering cloth. This is desirable from the fact that if a scraping mechanism is employed for removing the cake from a revoluble filter, such as Fig. 5, discloses, the scrapers will not be interfered with by any pipes or connections, but will be permitted to contact directly with the filter cloth. A scraping mechanism such as I describe is not herein shown, as it forms no essential part of the present invention.

In Fig. 7 I show another modification of my invention and wherein a longitudinally-split shell is employed as a container for the filtering leaves. In this construction, I have done away with the central stationary supporting frame of Figs. 1 to 4 inclusive and the halves or sections, 2ª, of the shell are hung from an upper shaft, 35. The filtering elements, 36, contained within the shell are suspended by means of brackets, 38, rigid with the end heads of the shell or casing, 2ª, and upon which brackets the extended ends of suitable pipes, 39, are supported, there being a flexible connection, 37, at the discharge ends of said pipes. This arrangement provides for a swinging motion and a spreading action of the filtering leaves or elements during the opening of the shell or casing and the discharging of the cake content. That is, as the two halves or sections of the shell are raised or caused to swing upwardly about their hinged connection, the longitudinal filtering elements which are loosely suspended at their ends upon the brackets, 38, tend to maintain a vertical position, and to move apart sidewise on account of each being mounted pivotally and diagonally in relation to one another, as shown in Fig. 8. With this construction it is obvious that a connection should be provided for filling or emptying the shell or casing and which connection will travel with a portion of the shell during the opening and closing operation thereof. I have accordingly shown the following method whereby this may be accomplished in a simple manner: In Fig. 7, a pipe, 40, having branch connections leading into the lower portion of the shell conveys slimes pulp or other material to the interior of the shell and which pulp or material is derived through a stationary pipe line 41, controlled by a valve, 42. A stuffing box, 43, is provided to take care of the rotation of the pipe, 40, about the suspending shaft, 35, said pipe being provided with a guide, 44, having a plug, 45, adapted to be secured to a T-coupling, 46. From this description it is obvious that the pipe, 40, may be rotated about the shaft, 35, which arrangement does away with temporary or flexible connections for feeding of slimes pulp or other material to the interior of the filter press.

If required, I may use overflow and air connections (not shown) at the top portion of the shell for the purpose of withdrawing the displaced air during the filling with slimes pulp or other material, or for the purpose of admitting compressed air to the press for displacing the excess unfiltered material from the shell or casing. I have shown a pipe, 47, controlled by a valve, 48, for the purpose of drawing off the excess solutions or admitting the wash solutions. The clear filtrate derived from the filter frames of Figs. 7 and 8 is discharged through suitable outlets, 49, which are individual and valve-controlled. If necessary air may be forced back into each of these individual outlets and into the interior of the filter leaves to facilitate the cake discharge when the filtering apparatus is opened.

Having thus described my invention what I claim as new and desire to secure by Letters Patent is:—

1. In a filter press, the combination with a filtering agent, of an inclosing shell or casing formed of sections hingedly secured along one longitudinal side and separable in unison in opposite directions.

2. In a filter press, the combination with a filtering agent, of an inclosing shell or casing formed of a pair of similar sections pivotally-suspended along their upper longitudinal sides and adapted to open in unison in opposite directions about either points of suspension.

3. In a filter press, the combination with a filtering agent, of an inclosing shell or casing formed of a pair of similar sections pivotally suspended along their upper longitudinal sides and adapted to close in unison from opposite directions.

4. In a filter press, the combination with a filtering agent, of an inclosing shell or casing formed of a pair of similar sections pivotally-suspended along their upper longitudinal sides, and adapted to open and close in unison in opposite directions.

5. A filter press provided with a filtering agent and having a shell or casing formed of similar sections pivotally suspended along their longitudinal sides from a point above, whereby the sections may hingedly open and close in unison in opposite directions.

6. A filter press having a shell or casing formed of similar sections pivotally suspended along their longitudinal sides from a point above, whereby the sections may hingedly open and close in unison in opposite directions, and filtering elements operatively sustained in said shell or casing when the sections are closed.

7. A filter press having a shell or casing formed of similar sections pivotally suspended along their longitudinal sides from a point above, whereby the sections may hingedly open and close in unison in opposite directions, and a locking mechanism for releasably securing the sections in their closed position.

8. A filter press having a shell or casing formed of similar sections pivotally suspended along their longitudinal sides from a point above, whereby the sections may hingedly open and close in unison in opposite directions, filtering elements operatively sustained in the shell or casing when the sections thereof are closed, a locking mechanism for releasably securing the sections in their closed position, means for admitting the material to be separated into the shell or casing, and means for delivering the liquid filtrate to a point outside of the shell or casing.

9. A filter press having a shell or casing formed of similar sections pivotally suspended along their longitudinal sides from a point above, whereby the sections may hingedly open and close in unison in opposite directions, filtering elements operatively sustained in the shell or casing when the sections thereof are closed, and means for forming fluid-tight joints between said sections.

10. A filter press having a shell or casing formed of similar sections pivotally suspended along their longitudinal sides from a point above, whereby the sections may hingedly open and close in unison in opposite directions, filtering elements operatively sustained in the shell or casing when the sections thereof are closed, a support upon which the sections are suspended, and means for moving the suspended upper sides of the sections toward each other after the sections are closed, to form a liquid tight joint.

11. A filter press having a shell or casing formed of similar sections pivotally suspended along their longitudinal sides from a point above, whereby the sections may hingedly open and close in unison in opposite directions, filtering elements operatively sustained in the shell or casing when the sections thereof are closed, a support upon which the sections are suspended, and means for moving the suspended upper sides of the sections toward each other after the sections are closed, to form a liquid-tight joint, said means comprising a shaft and eye-bolts mounted therein and loosely connected to the sections and forming a hinge-connection for the latter, said shaft having eccentrics embraced by said eye-bolts.

12. A filter press having a shell or casing formed of similar sections pivotally suspended along their longitudinal sides from a point above, whereby the sections may hingedly open and close in unison in opposite directions, filtering elements operatively sustained in the shell or casing when the sections thereof are closed, a support upon which the sections are suspended, and means for moving the suspended upper sides of the sections toward each other after the sections are closed, to form a liquid-tight joint, said means comprising a rotatable shaft above and extending longitudinally of the shell or casing, hinge-members on said sections and transversely slotted, eye-bolts extending through the slots of said members, and eccentrics on said shaft engageable in the eye-portions of said bolts.

In testimony whereof I affix my signature in presence of two witnesses.

ORANGE JAMES SALISBURY.

Witnesses:
  G. F. SUMMERS,
  JAMES B. WALKER, Jr.